United States Patent [19]

Katsura

[11] Patent Number: 4,967,376

[45] Date of Patent: Oct. 30, 1990

[54] METHOD FOR DISPLAYING CHARACTERS AND/OR FIGURES IN A COMPUTER GRAPHICS AND APPARATUS THEREOF

[75] Inventor: Koyo Katsura, Hitachioota, Japan

[73] Assignee: Hitachi, Ltd., Tokyo, Japan

[21] Appl. No.: 354,986

[22] Filed: May 22, 1989

[30] Foreign Application Priority Data

May 24, 1988 [JP] Japan ................................ 63-126554

[51] Int. Cl.$^5$ ................................................ G06F 3/00

[52] U.S. Cl. ...................................... 364/521; 340/703

[58] Field of Search ........................ 364/518, 521, 522; 340/747, 703, 701, 730, 750; 358/21 R, 22

[56] References Cited

U.S. PATENT DOCUMENTS

| | | | |
|---|---|---|---|
| 4,156,237 | 5/1979 | Okada et al. | 364/522 |
| 4,731,742 | 3/1988 | Nishi et al. | 364/521 |

FOREIGN PATENT DOCUMENTS

| | | | |
|---|---|---|---|
| 62-83790 | 4/1987 | Japan | 364/521 |
| 62-192878 | 8/1987 | Japan | 364/521 |
| 62262191 | 11/1987 | Japan | 364/521 |

OTHER PUBLICATIONS

"Fundamentals of Interactive Computer Graphics", published by Addison-Weslet Publishing Company.

*Primary Examiner*—Arthur G. Evans

*Attorney, Agent, or Firm*—Antonelli, Terry, Stout & Kraus

[57] ABSTRACT

In a computer graphic system, in which drawing data of pixels of an outline or outlines of a character and/or figure to be displayed are drawn in dots of drawing planes defined in a frame buffer memory, control data for controlling the painting of the character and/or figure in corresponding dots of control planes defined in the frame buffer memory synchronously with drawing of the drawing data in the drawing planes, and the painting is effected by scanning a predetermined area of the drawing planes, in which area the outline or outlines are drawn, by a horizontal scanning line and carrying out the drawing of drawing data in dots of the drawing planes, which exist on the horizontal scanning line, in accordance with the control data, a control data is written in the corresponding dot of the control planes by one of three different kinds of the control data in accordance with the state that the pixel belongs to a left edge of the outline or outlines, a right edge thereof or neither of them, and drawing data are drawn in dots of the drawing planes, which exist between dots corresponding to those dots of the control planes which have the control data indicating the left edge and the right edge.

15 Claims, 12 Drawing Sheets

OUTLINE

PAINTING

| COMMAND | PARAMETERS |
|---|---|
| OUTLINE | $n, x_1, y_1, x_2, y_2,$ ------ $, x_n, y_n$ |
| SCANPAINT | $x_a, y_a, x_b, y_b$ |

METHOD FOR DISPLAYING CHARACTERS AND/OR FIGURES IN A COMPUTER GRAPHICS AND APPARATUS THEREOF

BACKGROUND OF THE INVENTION

1. Field of the invention

The present invention relates to a method and apparatus for displaying characters and/or figures in a computer graphics, especially to a display method and apparatus capable of painting or coloring characters and/or figures in an improved manner.

2. Description of the related art

As a typical one of methods and apparatus for painting or coloring characters and/or figures in a computer graphics, there has been known a method disclosed in the laid-open Japanese patent application JP-A-62/192878 (1987), entitled "a method for painting a polygon".

According to this, an apparatus comprises a display memory having a plurality of drawing dots for bearing display data, which correspond to pixels in a raster-scan type display device, a work memory having the same number of drawing dots as those of the display memory, and a controller for executing the drawing (writing-in of display data) in the respective memories and the reading-out of the drawn data therefrom, and for controlling the display of the read-out data on a display device, in which the painting of polygons, which from characters and/or figures in combination, are carried out in the following manner.

Namely, display data of a polygon to be displayed are drawn in the display memory in a designated texture, and synchronously therewith, data of an outline of the polygon, which is called a painting frame, are drawn in the work memory in accordance with predetermined rules.

If the work memory, in which a painting frame of a polygon to be painted was drawn, is scanned by a horizontal scanning line and points, at which the scanning line crosses with the painting frame, are numbered in order from one end to the other, parts residing between cross points in odd numbers and those in even numbers belong to an inner part of the polygon. Therefore, the polygon can be painted thoroughly by repeating the painting starting from cross points in odd numbers and ending at those in even numbers, while shifting the horizontal scanning line vertically.

According to this method, the efficient painting of polygons, and hence characters and/or figures formed thereby, can be achieved without being subject to any limitation due to the number of vertexes and the sort of boundary lines of the polygons to be painted and without increasing an amount of calculation for painting.

By the way, as understood from the foregoing, it is expected in the prior art that a horizontal scanning line always crosses with a painting frame of a polygon to be painted at the even number of points.

If, however, a vertex or a side are commonly owned by two polygons to be painted, there occurs the case where a horizontal scanning line crosses with painting frames of those polygons at the odd number of points. In such case, a part of the polygons can not be painted. By way of example, if there are three cross points on a horizontal scanning line, the painting can be performed between the first and the second cross points, but a part between the second and the third cross points can not be painted, because the painting is always carried out only between cross points in odd numbers and those in even numbers, not between cross points in even numbers and those in odd numbers.

SUMMARY OF THE INVENTION

The present invention has been achieved in view of the aforesaid problem of the prior art display method and apparatus, and its object is to provide a method and apparatus capable of displaying characters and/or figures without any problem as mentioned above, i.e., more specifically, capable of thoroughly painting the characters and/or figures to be displayed, even if a horizontal scanning line crosses with painting frames of the polygons at odd number of points.

One of features of the present invention resides in a method for displaying characters and/or figures in a computer graphic system, in which an outline or outlines of a character and/or figure to be displayed are drawn and then the painting thereof is effected, comprising: step of drawing data (drawing data) of pixels forming the outline or outlines in dots of a first memory space defined in storage means of the computer graphic system dot by dot; step, executed simultaneously with drawing of a drawing data of a pixel of the outline or outlines in a dot of the first memory space, of writing data (control data) for controlling the painting in a corresponding dot of second memory space defined in the storage means; and step of effecting the painting by scanning a predetermined area of the first memory space, in which area the outline or outlines are drawn, by a horizontal scanning line and carrying out the drawing of drawing data in dots of the first memory space, which exist on the horizontal scanning line, in accordance with the control data, characterized in that the control data writing step writes a control data in the corresponding dot of the second memory space in accordance with the state that the pixel belongs to a left edge of the outline or outlines, a right edge thereof or neither of them, and that the painting effecting step effects the drawing of drawing data in dots of the first memory space, which exist between dots corresponding to those dots of the second memory space which have the control data indicating the left edge and the right edge.

Another feature of the present invention resides in an apparatus for displaying characters and/or figures, comprising: display means; system memory means for storing various programs; central processing means, coupled to said system memory means, for executing the programs stored in the system memory means to produce commands necessary for drawing an outline or outlines of a character and/or figure to be displayed and effecting the painting thereof; frame buffer memory means including two memory spaces defined therein, i.e., a first memory space, having plural dots corresponding to pixels of said display means, for storing drawing data of pixels of the outline or outlines dot by dot and a second memory space, having plural dots corresponding to the dots of the first memory space, for storing control data for controlling the painting of the character and/or figure; graphic processing means, coupled to the system memory means and central processing means as well as to the frame buffer memory means, for executing the commands supplied by the central processing means, whereby drawing data of the outline or outlines are drawn in dots of the first memory space, control data are written in corresponding dots of the second memory space simultaneously with drawing of the drawing data in the first memory space, and the painting is effected in the first memory space in accordance with the control data written in the second memory space, characterized in that the graphic processing means, when it draws drawing data of a pixel of the outline or outlines in a dot of the first memory space, writes one of three different kinds of the control data in a corresponding dot of the second memory space in accordance with the state that the pixel belongs to a left edge of the outline or outlines, a right edge thereof or neither of them, and draws drawing data in dots of the first memory space, which exist between dots corresponding to those dots of the second memory space which have the control data indicating the left edge and the right edge.

According to the present invention, when taking note of a dot having of the control data of either one of the left edge and the right edge on a horizontal scanning line, there always exists another dot having the other control data, which pairs with the dot, that is to say, there exist dots having the control data on a horizontal scanning line only as pairs. Since, therefore, the painting can be always carried out between dots of such pairs, the drawback of the prior art as mentioned above is improved, with the result that any non-painted portion never occurs in a character and/or figure to be displayed.

BRIEF DESCRIPTION OF THE DRAWINGS

FIGS. 1*a* to 1*c* schematically show arrangements of an embodiment of the present invention and its variations, in which FIGS. 1*b* and 1*c* show only a pertinent portion thereof;

DESCRIPTION OF THE PREFERRED EMBODIMENTS

In the following, the explanation will be made of a method and apparatus for displaying characters and/or figures according to the present invention, with reference to the accompanying drawings.

Figure 1A:
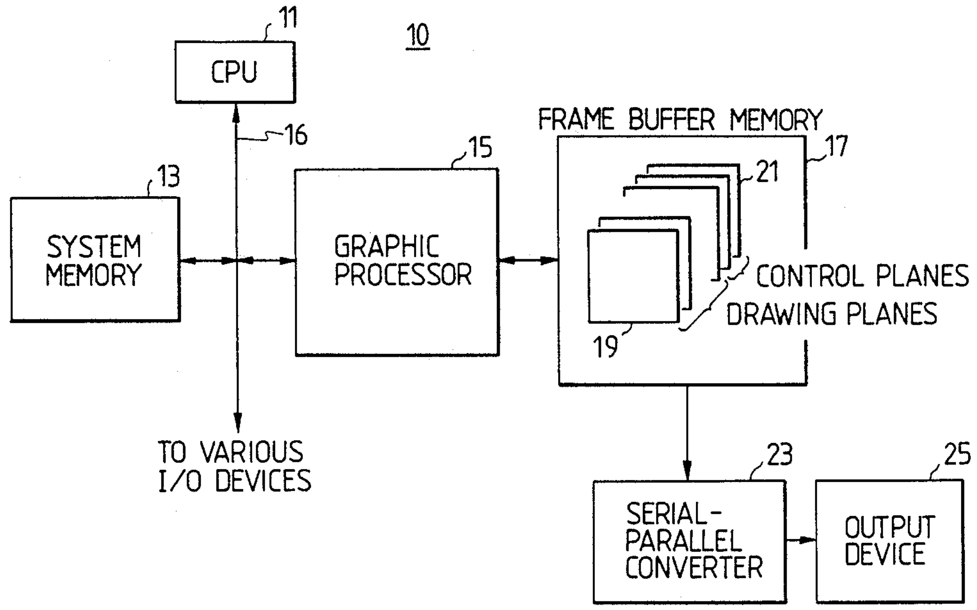

Referring first of all to FIG. 1*a,* there is shown an configuration of system 10 according to an embodiment of the present invention. The system 10 comprises central processing unit (CPU) 11, system memory 13 and graphic processor 15, which are all coupled with one another by bus line 16. There can be further coupled various kinds of known input/output (I/O) devices to the bus line 16, if necessary.

The CPU 11, a processor for managing and controlling the system 10 as a whole, executes programs stored in the system memory 13 to produce coordinate data and commands necessary for display of characters and/or figures. The system memory 13 also stores various data necessary for execution of the programs by the CPU 11. The commands produced by the CPU 11 are transferred to the graphic processor 15.

The graphic processor 15 is further coupled with frame buffer memory 17. The processor 15 carries out drawing of graphic data of characters and/or figures in the frame buffer memory 17 by executing the commands transferred thereto. The frame buffer memory 17 is in turn coupled to serial-parallel converter 23, in which parallel data read out from the frame buffer 17 is converted into the serial form to produce high-speed video data supplied to output device 25, such as a CRT display, a liquid crystal display or a printer.

The graphic processor 15 also controls reading-out of data from the frame buffer memory 17 and outputting the read-out data to the output device 25.

The frame buffer memory 17 stores pixel by pixel graphic data, which include drawing data for drawing characters and/or figures and control data for controlling the painting of the characters and/or figures. The drawing data are stored in drawing planes 19 defined in the frame buffer memory 17 as a two-dimensional memory space of x-y coordinates, and the control data are stored in control planes 21 also defined in the frame buffer memory 17.

As the drawing planes 19, there are provided planes of the number of sheets corresponding to the number of colors and/or tones required for display of characters and figures. In a single-tone, monochromatic display, in which one pixel is displayed by data of one bit (i.e., 1 bit/pixel), one sheet of the drawing plane 19 is sufficient. In the case of a 16-color display or a 16-tone, monochromatic display, four sheets of the drawing planes 19 are required, because one pixel in this case is necessary to be displayed by data of four bits (i.e., 4 bits/pixel).

The number of sheets of the control planes 21 is determined in accordance with the necessity of control, such as a cursor control, a blinking control and so on. As will be described later, two bits of control data are required in order to perform the control operation according to the present invention, and therefore, there are needed at least two sheets of the control planes 21.

Figure 1B:
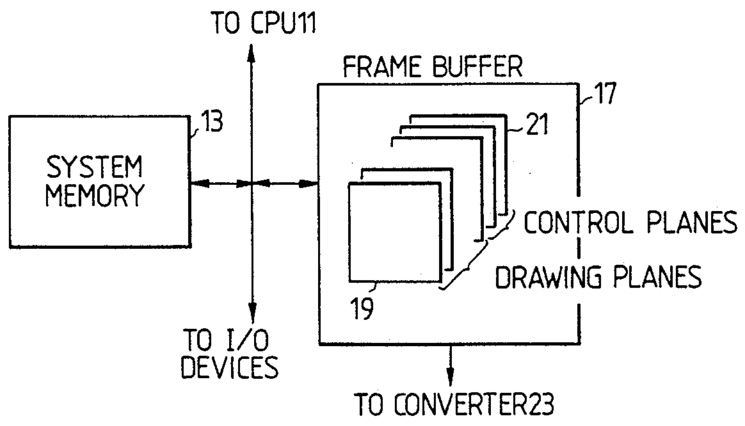
Figure 1C:
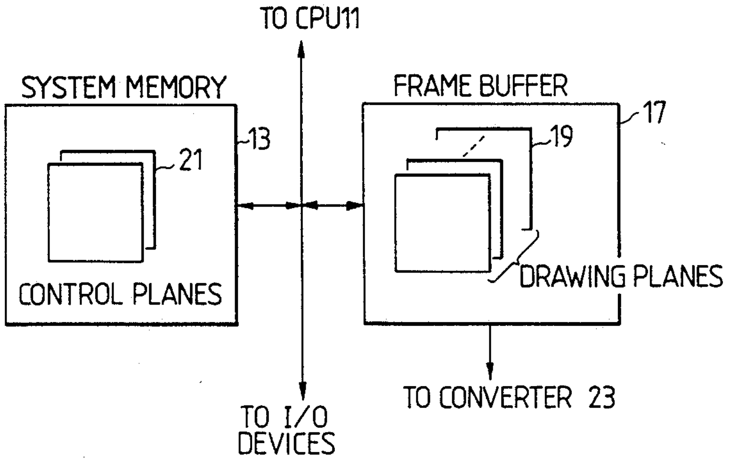

In FIGS. 1*b* and 1*c*, there are shown two variations of the configuration of the embodiment mentioned above. However, in those figures, only the pertinent portion of the variations is shown. Parts not shown are to be considered to be the same as those in FIG. 1*a*. Further, the identical parts in those figures are indicated by the identical reference numerals in FIG. 1*a*.

FIG. 1*b* shows a variation, in which a graphics-borne processor such as the graphic processor 15 is omitted, and the function thereof can be equivalently achieved by programs stored in the system memory 13 and executed by the CPU 11. FIG. 1*c* shows another variation, in which the frame buffer memory 17 is dedicated only to the drawing planes 19, and the control planes 21 are provided in the system memory 13. The another variation is suitable, when a memory available for the frame buffer memory 17 is small in its storage capacity.

Figure 2A:
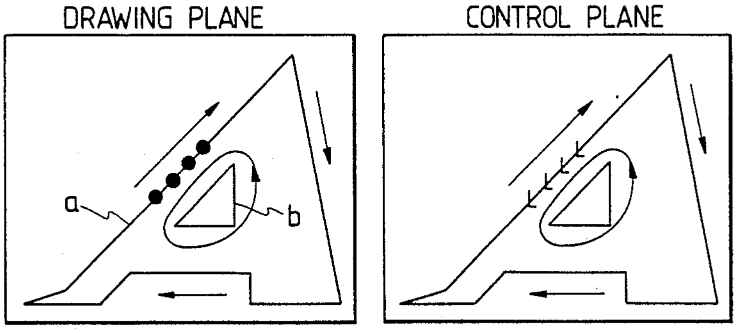
FIGS. 2*a* and 2*b* are drawings for explaining the concept of the operation of the embodiment of the present invention.
Figure 2B:
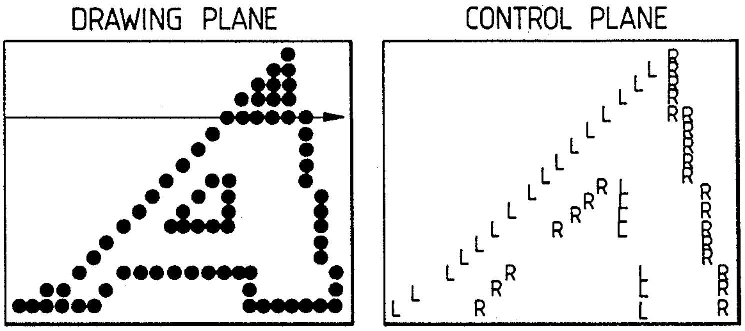

Referring next to FIGS. 2*a* and 2*b*, there will be explained the concept of drawing and painting operation in accordance with the present invention.

An outline or outlines of a character and/or figure to be displayed are drawn in the drawing planes 19 of the frame buffer memory 17 in accordance with the following rules;

(i) an outline or outlines of a character and/or figure are expressed by the combination of plural closed curves or polygons;

(ii) a closed curve or polygon is drawn in a continuous manner, e.g., by one stork of the pen;

(iii) a closed curve or polygon can be formed not only by linear line segments, but also by curved ones;

(iv) the generation of a closed curve or polygon is forwarded in a constant direction arbitrarily determined, e.g., in such a direction that the inner side of the closed curve or polygon is always viewed in the right-hand side with respect to the direction and hence the outer side thereof in the left-hand side.

In FIG. 2*a* (left), outlines of a character to be displayed (character A in the instance of FIG. 2*a*) are drawn in the drawing planes 19 in accordance to the rules mentioned above. As shown in the figure, the character A has two outlines, i.e., an outer outline a and an inner one b, both of which are closed to form polygons, respectively.

Further, as understood from arrows in the figure, the directions of drawing the outlines, i.e., the generating directions of the outlines, are different from each other between the outer outline a and the inner one b. The outer outline a of the character A is drawn clockwise and the inner one b counterclockwise. This is caused by the rule (iv) mentioned above.

When the outlines are drawn in the drawing planes 19, data concerning every dot forming the outlines drawn in the drawing planes 19 are written dot by dot also in the control planes 21 synchronously therewith. Since the data written in the control planes 21 are used to control the painting, they will be called control data, hereinafter. An example of a part of the control data "L" is shown in FIG. 2*a* (right).

The control data can assume three different values; i.e., "0" indicating that a corresponding dot is neither on a left edge nor on a right edge of an outline or outlines drawn in the drawing planes 19, "L" indicating that a corresponding dot is on a left edge of the outline or outlines, and "R" indicating that a corresponding dot is on a right edge thereof. Further, before the control data writing operation as mentioned above, the control planes 21 are all initialized at "0".

Rules of writing the control data in the control planes 21 are as follows;

(i) Control data "L" is written in a certain dot of the control planes 21, when the position of the certain dot has the upward change in a y-coordinate (ordinate) direction, compared with that of a previous dot with respect to the generating direction of a closed curve. If, however, control data "R" is already written in the certain dot of the control planes 21, it is rewritten by "0";

(ii) Control data "R" is written in a certain dot of the control planes 21, when the position of the certain dot has the downward change in the y-coordinate direction, compared with that of a previous dot with respect to the generating direction of a closed curve. If, however, control data "L" is already written in the certain dot of the control planes 21, it is rewritten by "0"; and (iii) Nothing is written in a certain dot in the control planes 21, when the position of the certain dot does not have any change in the y-coordinate direction, compared with that of a previous dot with respect to the generating direction of a closed curve. Namely, the dot is maintained at "0".

When the drawing of the outline or outlines in the drawing planes 19 is completed, the control data as shown in FIG. 2*b* (right) are written in the control planes 21. The painting is carried out in accordance with this control data written in the control planes 21.

Namely, the painting of the character A is achieved by scanning a rectangular area surrounding the character A from top to bottom (or from bottom to top) by a horizontal scanning line running from left to right, and carrying out the drawing of drawing data in dots of the drawing planes 19, which exist on the horizontal scanning line between the control data "L" and "R", as shown in FIG. 2*b* (left). Further, it will be easily understood that if the scanning is carried out from right to left, the painting must be carried out between the control data "R" and "L".

Next, the allotment of the drawing planes 19 and the control planes 21 in the frame buffer memory 17 and the structure of data stored therein will be described, before the explanation of the processing operation of the graphic processor 15 for achieving the concept mentioned above.

Figure 3:
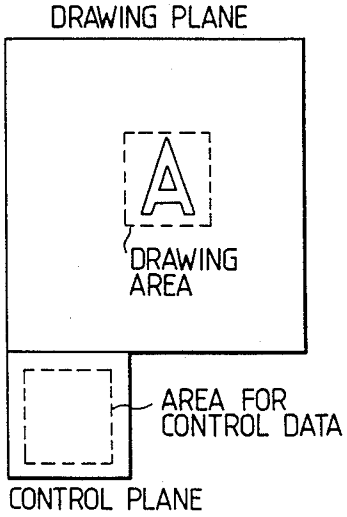
FIG. 3 is a drawing for showing an example of the allotment of a drawing plane and a control plane in a frame buffer memory in FIGS. 1*a* to 1*c;*

In FIG. 3, there is shown an example of the allotment of the drawing planes 19 and the control planes 21 in the frame buffer memory 17 (in the figure, both are represented by one plane, respectively). This allotment is effected by defining address spaces for the drawing planes 19 and the control planes 21 in a real address space of the frame buffer memory 17. Further, an area for control data, which is commensurate with the maximum size of a character and/or figure to be displayed, is defined in the control planes 21. Parameters for defining these planes are stored in registers within the graphic processor 15 in the case of FIG. 1*a* or within the CPU 11 in the cases of FIGS. 1*b* and 1*c*.

Examples of the structure of the drawing data drawn in the drawing planes 19 are shown in FIGS. 4*a* to 4*f*. In the examples shown, one word in the frame buffer memory 17 is defined by 32 bits (i.e., 32 sheets of the drawing planes are used in this case). One or more packs of drawing data for one pixel are defined within this one word, in which a number of bits of one drawing data pack is determined in accordance with the number of colors and/or tones required for displaying a pixel.

Figure 4A:
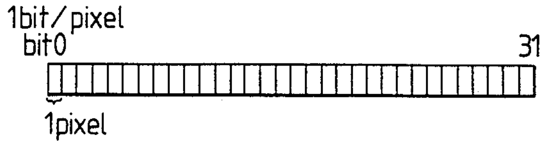
FIGS. 4*a* to 4*f* show examples of the construction of data in the drawing plane.
Figure 4B:
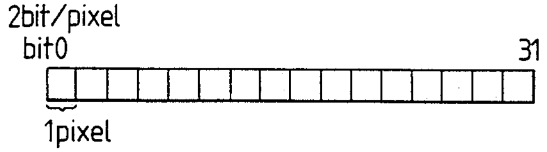
Figure 4C:
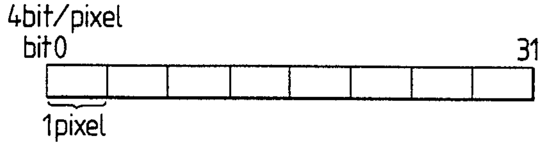
Figure 4D:
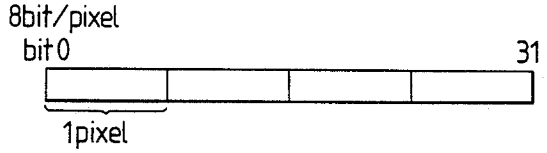
Figure 4E:
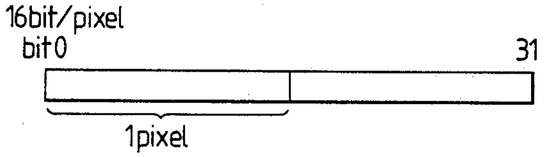
Figure 4F:
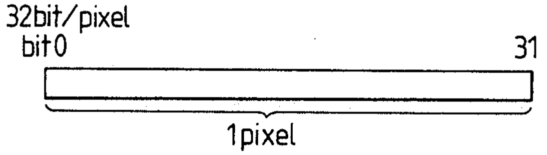

For example, FIG. 4*a* shows the drawing data of a data length of 1 bit/pixel, which is used for the single tone, monochromatic display and FIG. 4*c* shows that of 4 bits/pixel, which can be used for the 16 color display or the 16 tone, monochromatic display. If the drawing data of a data length of 32 bits/pixel is used, one pixel can be displayed in the considerably large number of colors or tones, with the result that a natural color display will be made possible.

Figure 5:
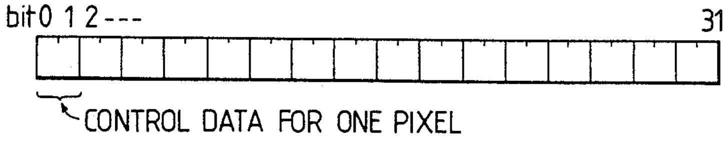
FIG. 5 shows an example of the construction of data in the control plane.

In FIG. 5, there is shown the structure of the control data in the control planes 21. As apparent from the figure, one word in the frame buffer memory 17 can include the control data for 16 pixels.

Figures 6A, 6B:
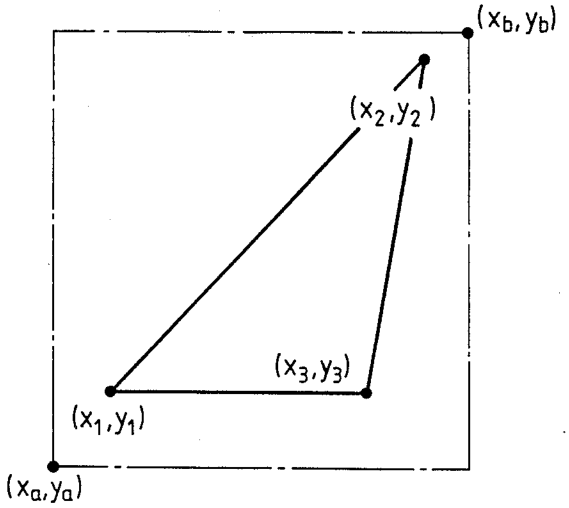
FIG. 6*a* is a table of showing an example of a format of commands OUTLINE and SCANPAINT supplied to a graphic processor in FIGS. 1*a* to 1*c*.
FIG. 6*b* is a drawing for explaining the function of these commands.

Referring next to FIGS. 6*a* and 6*b*, explanation will be given of commands, which are supplied by the CPU 11 and executed by the graphic processor 15.

A command OUTLINE is a command for generating or drawing a closed curve or polygon. In the case of a closed curve, the curve is resolved by the CPU 11 into plural linear line segments and simulated by a polygon. Therefore, an OUTLINE command has the number n of line segments and coordinate data $x_1$, $y_1$, $x_2$, $y_2$ . . . , $x_n$, $y_n$ of end points of the respective line segments as parameters. Usually, a plurality of OUTLINE commands are needed in order to draw outlines of a character and/or figure. Two OUTLINE commands are required in the example shown in FIG. 2*a*; i.e., one for the outer outline a and the other for the inner outline b.

A command SCANPAINT has coordinate data $x_a$, $y_a$, $x_b$, $y_b$ as parameters. These parameters define a given rectangular area, which includes a character and/or figure to be displayed. If a SCANPAINT command is executed, the painting is carried out within the area defined by the command in accordance with the control data written in the control planes 21 for the dots within this area.

An example will be explained with reference to FIG. 6*b*. In this case, a single OUTLINE command is sufficient; i.e., OUTLINE (3, $x_1$, $y$,$x_2$, $y_2$, $x_3$, $y_3$). The command for painting in this case is SCANPAINT ($x_a$, $y_a$, $x_b$, $y_b$). As the result of execution of those commands, an inner part of a triangle defined by three vertexes ($x_1$, $y_1$), ($x_2$, $y_2$) and ($x_3$, $y_3$) is painted.

Next, explanation will be made of the processing operation when the aforesaid commands are executed by the graphic processor 15. In the following, it is assumed that, as already described, an outline or outlines of a character and/or figure are drawn in such a direction that an outer part of the outline or outlines is always viewed on the left-hand side with respect to the drawing direction and hence an inner part thereof on the right-hand side.

It is of course that the drawing direction can be assumed in the opposite to the above described direction. Further, it is also possible that the drawing direction is made changeable by using an additional one bit within a command code of an OUTLINE command.

Figure 7:
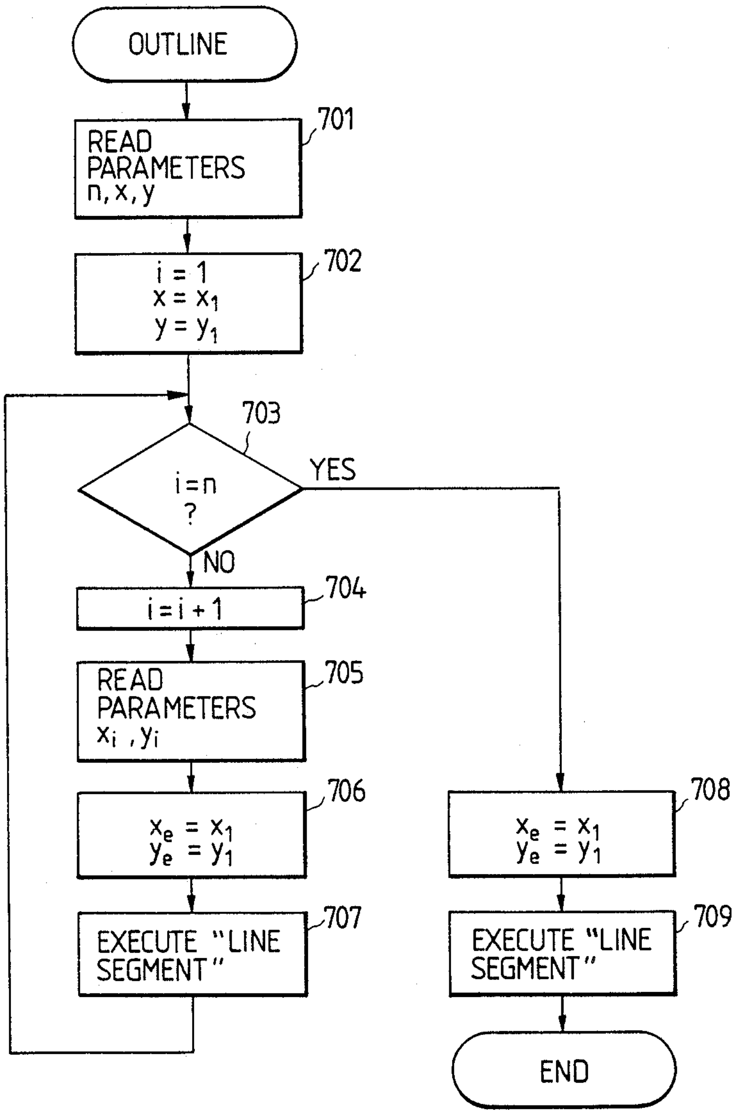
FIG. 7 is a flow chart illustrating the processing operation of the command OUTLINE executed by the graphic processor.

Referring at first to FIG. 7, the processing operation of the OUTLINE command will be explained.

When the execution of this command starts, parameters included in the command are read at step 701. Then, at step 702, i=1 is set and the coordinate data (x, y) is initiated at ($x_1$, $y_1$), which indicates a start point of the drawing of a line segment. After that, it is discriminated at step 703 whether or not i is equal to n.

When it was judged that i is not n, the processing operation goes to step 704, at which i is made 2 by increasing 1. Then, at step 705, parameters $x_2$, $y_2$ are read out on the basis of a new value, i.e. 2, of i. This means that a coordinate value of a next dot is read out. At step 706, the dot ($x_2$, $y_2$) is taken as a dot ($x_e$, $y_e$), which represents an end point of the line segment to be drawn.

Thereafter, a subroutine LINE SEGMENT is executed at step 707, which will be explained in detail later. By the execution of this subroutine, the line segment is generated between the dot ($x_1$, $y_1$) and the dot ($x_2$, $y_2$).

After the line segment has been generated, the processing operation returns to step 703, and the same processing operation as mentioned above is repeated until i reaches n. As a result, line segments are generated between a dot ($x_{i-1}$, $y_{i-1}$) and a dot ($x_i$, $y_i$).

When it was judged at step 703 that i became n, the processing operation is advanced to step 708, at which the dot ($x_1$, $y_1$), which is the start point of the first line segment, is taken as the end point ($x_e$, $y_e$), and then the subroutine LINE SEGMENT is executed at step 709, whereby a last line segment is drawn between the dot ($x_n$, $y_n$) and the dot ($x_1$, $y_1$). With the generation of this line segment, a series of the line segments following one after another are closed, and the processing operation of the OUTLINE command ends.

Referring to a flow chart of FIG. 8, the processing operation of the subroutine LINE SEGMENT will be explained hereinafter. The subroutine LINE SEGMENT is a routine for drawing a line segment between a certain dot (x, y) as a start point of the drawing and a dot ($x_e$, $y_e$) as an end point thereof.

When this routine starts to run, the initialization of various variables is executed at step 801. Namely, increments (or decrements) $\Delta x$ and $\Delta y$ between the dots (x, y) and ($x_e$, $y_e$) in x and y coordinates and variables $S_x$ and $S_y$ of signs of the increments $\Delta x$ and $\Delta y$ are obtained and an error factor "err" is set at zero.

The sign variable $S_x$ assumes +1 and −1, when $\Delta x$ is positive and negative, respectively. The same is true of the relationship between $S_y$ and $\Delta y$. The error factor "err" represents the difference between a center of a dot and a coordinate value of a corresponding point on a line segment to be generated. Further details of the factor "err" will become apparent from the description made with reference to FIGS. 10*a* and 10*b* later.

Figure 10A:
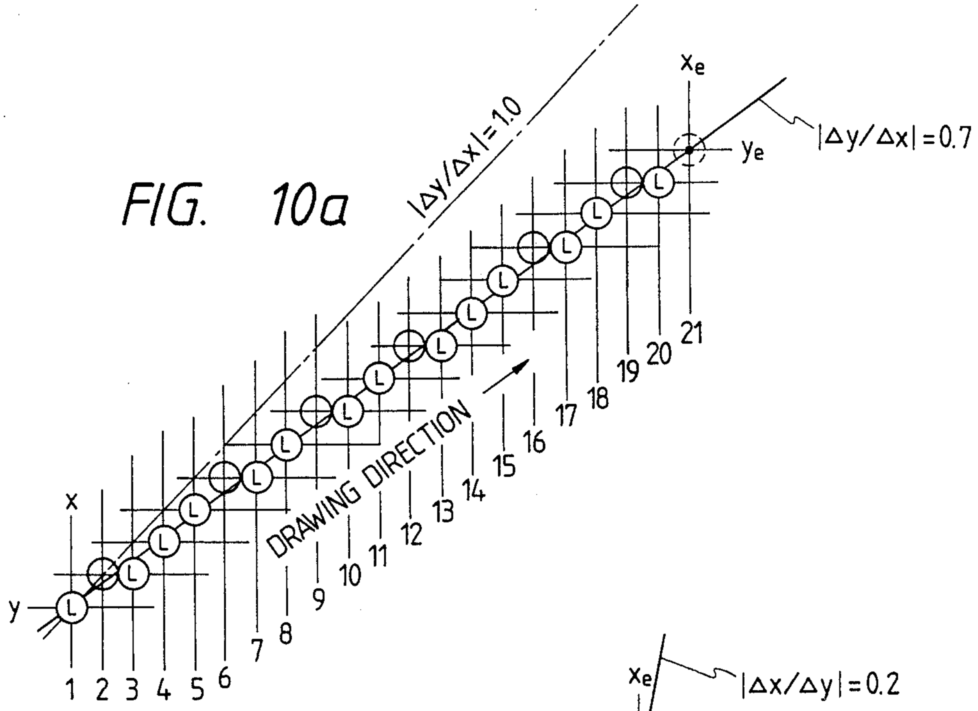
FIGS. 10*a* and 10*b* are drawing for explaining the operation of drawing of a line segment.

Now, after the initialization of the variables mentioned above, the processing operation goes to step 802, at which the absolute value of $\Delta x$ is compared with that of $\Delta y$. If $|\Delta y|$ is not larger than $|\Delta x|$,i.e., $|\Delta x| \geqq |\Delta y|$, processing operation is advanced to step 803. This is the case, in which if a line segment to be generated is represented by $y=k\cdot x$, k is smaller than 1.0. FIG. 10*a* shows an example of this case, which will be explained in detail later.

Figure 8:
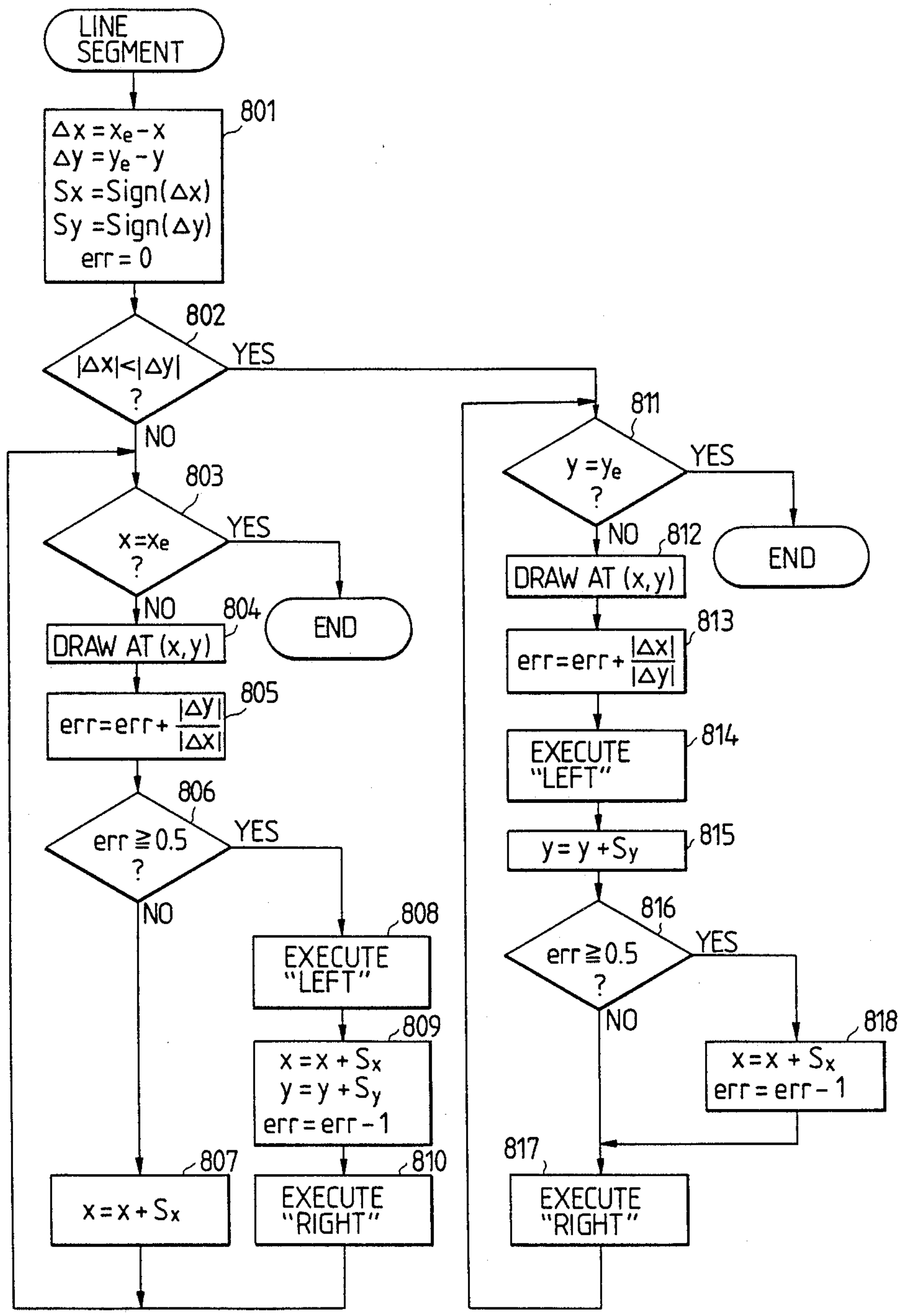
FIG. 8 is a flow chart illustrating the processing operation of a subroutine LINE SEGMENT included in the flow chart of FIG. 7.

In this case, according to the algorithm underlying the flow chart of FIG. 8, every time when one dot is drawn in the drawing planes 19, the x-coordinate value of a dot to be drawn next is always varied by an amount corresponding to one dot and, on the other hand, it is discriminated whether or not the y-coordinate value of the next dot is to be varied. Namely, every time when the x-coordinate value of a dot is varied, a displacement ($|\Delta y/\Delta x|$) per one dot is accumulated as the error factor "err", and when the accumulated value of "err" exceeds 0.5, the y-coordinate value of the dot is increased by an amount corresponding to one dot.

To achieve this, it is at first discriminated at step 803 whether or not a dot to be drawn is an end point of the line segment to be generated. This discrimination is carried out one the basis of the x-coordinate value of the dot. When it was judged at step 803 that the dot is the end point of the line segment, the processing operation ends, because the generation of the line segment is completed.

If the dot is not the end point of the line segment to be generated, then the processing operation is advanced to step 804, at which the drawing is carried out at the dot (x, y) in the drawing planes 19. This means that a pixel corresponding to the dot (x, y) is displayed on a display device.

Then, at step 805, the aforesaid displacement $|\Delta y/\Delta x|$ is added to the factor "err", whereby a new value of "err" is obtained. Thereafter, it is discriminated at step 806 whether or not the thus obtained new value of "err" exceeds 0.5. If the value of "err" is smaller than 0.5, only the x-coordinate value x of a dot to be drawn next is renewed by adding $S_x$ thereto at step 807, and the processing operation returns to step 803. Thereby, the next dot is shifted by an amount corresponding to one dot only in the x-coordinate direction, i.e., it moves parallel with respect to the x-coordinate.

When it was judged at step 806 that the new value of "err" is equal to or larger than 0.5, the processing operation is advanced to step 808, at which a subroutine LEFT is executed. The subroutine LEFT, although its details will be described later, is a routine executed by the graphic processor 15 by referring to the control planes 21 of the frame buffer memory 17.

After the execution of the routine LEFT is completed, the processing operation goes to step 809, at which both the coordinate values x and y of a dot to be drawn next are varied by $S_x$ and $S_y$, respectively. Namely, the next dot is shifted by an amount corresponding to one dot in the directions of both the x and y coordinates.

Further, at this step, the accumulated value of "err" is renewed by subtracting 1 therefrom. This is because the y coordinate value is varied by an amount corresponding to one dot nevertheless the error factor "err" does not yet reach the value corresponding to one dot.

Thereafter, the processing operation goes to step 810, at which another subroutine RIGHT is executed. Similarly to the subroutine LEFT, also the routine RIGHT, although its details will be described later, is a routine executed by the graphic processor 15 by referring to the control planes 21 of the frame buffer memory 17. After the execution of the routine RIGHT is completed, the processing operation returns to step 803.

By repeating the processing operation as mentioned above until x reaches $x_e$ (cf. step 803), the line segment is generated between the dot (x, y) and the dot ($x_e$, $y_e$).

Let us return to step 802. When it was judged at this step that $|\Delta y|$ is larger than $|\Delta x|$, the processing operation is advanced to step 811. This is the case, in which if a line segment to be generated is represented by $y=k\cdot x$, k is larger than 1.0. FIG. **10*b*** shows an example of this case, which will be explained in detail later.

In this case, every time when one dot is drawn in the drawing planes 19, the y-coordinate value of a dot to be drawn next is always varied by an amount corresponding to one dot and, on the other hand, it is discriminated whether or not the x-coordinate value of the next dot is to be varied. Namely, every time when the y-coordinate value of a dot is varied, a displacement ($|\Delta x/\Delta y|$) per one dot in the x-coordinate is accumulated as the error factor "err", and when the accumulated value of "err" exceeds 0.5, the x-coordinate value is increased by an amount corresponding to one dot.

To achieve this algorithm, at step 811, it is at first discriminated whether or not a dot to be drawn is an end point of the line segment to be generated. The discrimination in this case is carried out on the basis of the y-coordinate value of the dot, whereas the discrimination at step 803 in the first case was carried out on the basis of the x-coordinate value.

When it was judged at this step that the dot is an end point of the line segment to be generated, the processing operation ends, because the generation of the line segment is completed. If, however, the dot is not the end point, the processing operation is advanced to step 812, at which the drawing is carried out at the dot (x, y) in the drawing planes 19.

At step 813, the aforesaid displacement $|\Delta x/\Delta y|$ is added to the factor "err", whereby a new value of "err" is obtained. Then, the subroutine LEFT is executed at step 814. After the execution of the routine LEFT is completed, only the y-coordinate value y of a dot to be drawn next is varied by adding $S_y$ thereto at step 815, and the processing operation is advanced to step 816.

Thereafter, it is discriminated at step 806 whether or not the thus obtained new value of "err" exceeds 0.5. If the value of "err" is smaller than 0.5, the processing operation goes to step 817, at which the routine RIGHT is executed. After the completion of execution of the routine RIGHT, the processing operation returns to step 811. In this case, since only the y-coordinate value is varied at step 815, the next dot is shifted by an amount corresponding to one dot only in the y-coordinate direction, i.e. it moves parallel with respect to the y-coordinate.

When it was judged at step 816 that the new value of "err" is equal to or larger than 0.5, the processing operation is advanced to step 818, at which the x-coordinate value x of the next dot is are varied by $S_x$. Namely, the next dot is shifted by an amount corresponding to one dot in the direction of the x-coordinate. Therefore, the next dot is resultantly shifted by an amount corresponding to one dot in both directions of the x and y coordinates, since the y-coordinate value is already varied at step 815.

Further, at this step, the accumulated value of "err" is renewed by subtracting 1 therefrom. This is because the x-coordinate value is varied by an amount corresponding to one dot nevertheless the error factor "err" does not yet reach the value corresponding to one dot. After the calculation at step 818, the routine RIGHT is executed at step 817. Then, the processing operation returns to step 811.

By repeating the processing operation as mentioned above until y reaches $y_e$ (cf. step 811), the line segment is generated between the dot (x, y) and the dot ($x_e$, $y_e$).

In the processing operation described above, the part of generating a line segment is already known as the Bresenham's line algorithm (cf. for example, James D. Foley et al, "Fundamentals of Interactive Computer Graphics" published by Addison-Wesley Publishing Company in 1982). Other known algorithms can be also employed as a line generating algorithm. The characteristic portion in the processing operation shown in FIG. 8 is that there are provided the processing (steps 808 and 814) by the routines LEFT and RIGHT added before and after the renewal (steps 809 and 815) of the coordinate value of a dot to be drawn next.

Figure 9A:
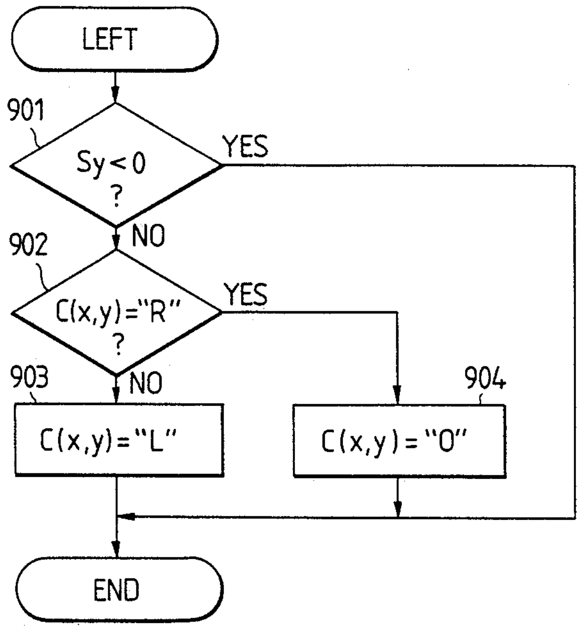
FIGS. 9*a* and 9*b* are flow charts illustrating the processing operation of subroutines LEFT and RIGHT included in the flow chart of FIG. 8.
Figure 9B:
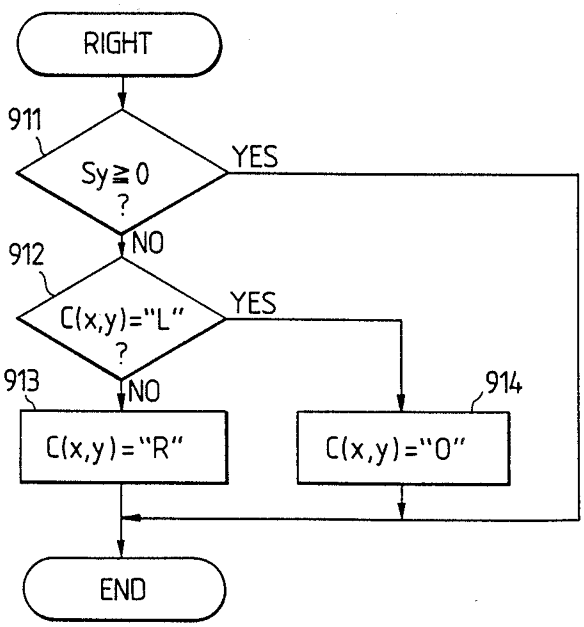

Referring next to FIGS. 9*a* and 9*b*, the aforesaid subroutines LEFT and RIGHT will be explained.

These routines are routines for judging and determining that a dot belongs to a left edge or a right edge of an outline now under drawing with respect to the direction of a horizontal scanning line or it does not belong to both and for writing the control data "L", "R" or "0" in a corresponding dot in the control planes 21. As apparent from the flow charts of both figures, the contents of both the routines are similar to each other. Accordingly, the description herein will be based mainly on the routine LEFT, any different portion relative to the routine RIGHT being described as needed.

Further, it is to be noted that, as will be understood from the foregoing description of the flow chart of FIG. 8, the processing operation of these routines is carried out with respect to a dot, of which note is taken in the processing operation of FIG. 8. Such a noting dote is indicated by C(x, y) in the flow charts of FIGS. 9*a* and 9*b*.

In FIG. 9*a*, it is at first discriminated at step 901 whether or not the variable $S_y$ is negative. If $S_y$ is negative, the processing operation ends at once. To the contrary, the processing operation in the routine RIGHT ends, when $S_y$ is 0 or positive (cf. step 911 in FIG. 9*b*). In these steps 901 and 911, it is discriminated whether a line segment to be generated has the upward change with respect to the generating direction thereof or whether it has the downward change with respect to the generating direction.

When it was judged that $S_y$ is not negative, i.e., in the case where a line segment to be generated has the upward change with respect to the generating direction, it is discriminated at step 902 whether or not the control data "R" is already drawn in a noting dot C(x, y) of the control planes 21. If nothing is written therein, the control data "L" is written in the noting dot at step 903 and the processing operation ends. Otherwise, i.e., if "R" is already written, the processing operation ends, after the noting dot is rewritten by "0" at step 904.

Also in the routine RIGHT, the analogous processing operation is carried out, except that the control data "L" and "R" are reversed (cf. steps 912 to 914 in FIG. 9*b*).

As already described, in the flow chart of FIG. 8, the processing (step 808, 814) of the routine LEFT is carried out before the renewal (step 809, 815) of the coordinate values takes place, and the processing (step 810, 817) of the routine RIGHT is carried out after the renewal (step 809, 815, 818) of the coordinate values takes place. As a result, the control data "L" and "R" are always written in the control planes 21 as a pair on a horizontal scanning line. The order of the execution of the routines LEFT and RIGHT can be reversed with respect to the renewal of the coordinate values, because it depends on the scanning direction of the horizontal scanning line.

Figure 10B:
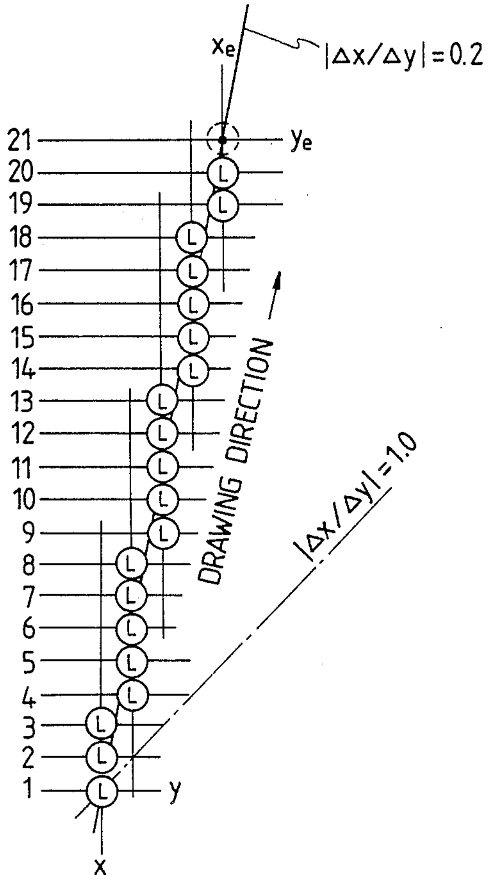

In FIGS. 10*a* and 10*b*, there are shown examples of a line segment generated between the dot (x, y) and the dot ($x_e$, $y_e$) by the execution of the processing operation described above referring to FIGS. 8, 9*a* and 9*b*.

There is shown in FIG. 10*a* a case, in which a line segment (thick solid line) to be generated has the gradient 0:7 and therefore is more gentle in its slope than a line (chain line) having the gradient 1.0. Drawing data are drawn in the drawing planes 19 at addresses corresponding to small circles, and control data are written in the control planes 21 at addresses corresponding to small circles with character L.

FIG. 10*b* shows another case, in which a line segment (thick solid line) to be generated has the gradient 1/0.2 and therefore is steeper in its slope than a line (chain line) having the gradient 1.0.

In both figures, the end dot ($x_e$, $y_e$) is not drawn, because this dot is made a start dot of a next line segment, whereby this dot is prevented from being drawn twice. To this end, steps 804 and 812 for drawing are provided after steps 803 and 811, respectively.

In the following, description will be made of the processing operation of the SCANPAINT command, referring to a flow chart of FIG. 11.

As already described, the SCANPAINT command has coordinate data of two dots as parameters, by which a rectangular area to be scanned is defined, as shown in FIG. 6*b*. Assuming that the defined rectangular area is scanned from bottom to top and from left to right, a left bottom point and a right top point are necessary to be determined as a start point and an end point of the scanning, respectively.

At step 1001, therefore, a start point ($x_s$, y) and an end point ($x_e$, $y_e$) are calculated from the parameters given by the SCANPAINT command. Then, the x-coordinate value x is set at the value xs of the start point at step 1002. Thereafter, the loop operation as described below is repeated.

At first, a dot C(x, y) in the control planes 21 is referred to and it is discriminated at step 1003 whether or not the control data "L" is drawn in the dot C(x, y). If "L" is drawn therein, the processing operation goes to step 1004, at which a painting flag P-flag is raised and drawing data are drawn in the drawing planes 19 during P-flag is on. Otherwise, the processing operation goes to step 1005, at which it is discriminated whether or not P-flag is raised for the dot C(x, y).

If P-flag is raised, drawing data are drawn in the drawing planes 19 at step 1006, and otherwise it is discriminated at step 1007 whether or not the control data "R" is written in the dot C(x, y) of the control planes 21. If "R" is written therein, P-flag is released and the drawing of drawing data in the drawing planes 19 is stopped. Otherwise, the processing operation goes to step 1009, at which it is discriminated whether or not the dot C(x, y) is the end point.

When it was judged at step 1009 that the dot C(x, y) is not the end point, the x-coordinate value x is increased by 1 at step 1010. Thereafter, the processing operation returns to step 1003 and the same processing operation as described above is repeated until the x-coordinate value x becomes equal to $x_e$. When it was judged at step 1009 that x is equal to $x_e$, this means that the painting is completed between the dot having "L" and the dot having "R" with respect to one horizontal scanning line.

Then, the processing operation is advanced to step 1011, at which it is discriminated whether or not y is equal to $y_e$, i.e., whether or not the horizontal scanning line was a last scanning line. If y is equal to $y_e$, the processing operation ends, since the scanning of the top of the defined rectangular area has been completed.

If y is not equal to $y_e$, y is increased by 1 at step 1012 and the processing operation returns to step 1002. Then, the x-coordinate value x is again set at $x_s$, and the same operation as described above is repeated until y becomes equal to $y_e$.

As described above, the painting is carried out between the dot having "L" and the dot having "R", while shifting the horizontal scanning line, which runs from left to right, from bottom to top of the defined rectangular area line by line. As a result, when y became equal to $y_e$, the painting of an inner portion of an outline drawn within the defined rectangular area is completed.

Figure 11:
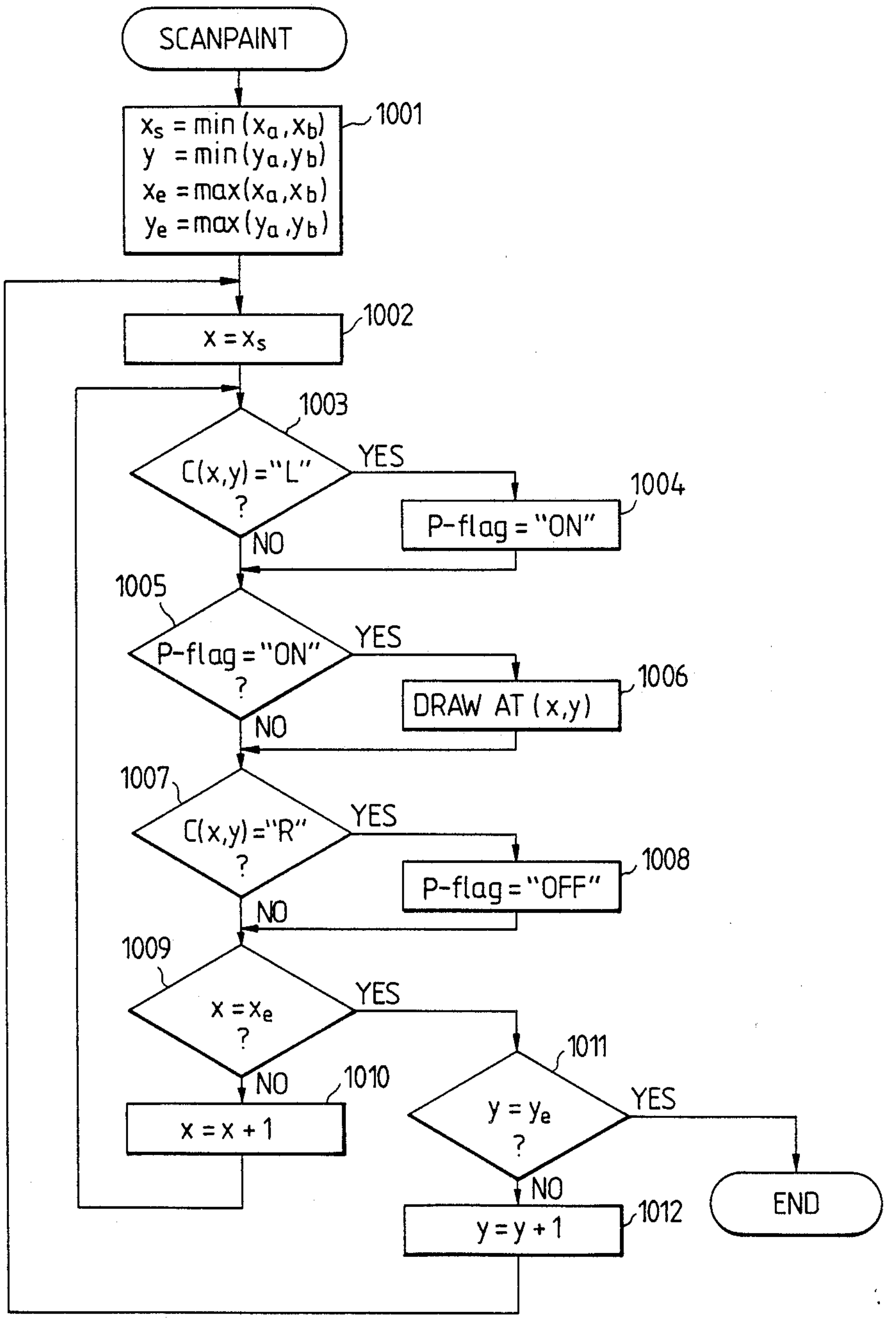
FIG. 11 is a flow chart illustrating the processing operation of the command SCANPAINT executed by the graphic processor.

Further, in the flow chart of FIG. 11, the painting has been carried out dot by dot. The high speed painting can be realized by providing an appropriate memory, in which data for plural dots are stored at a time.

Figure 12:
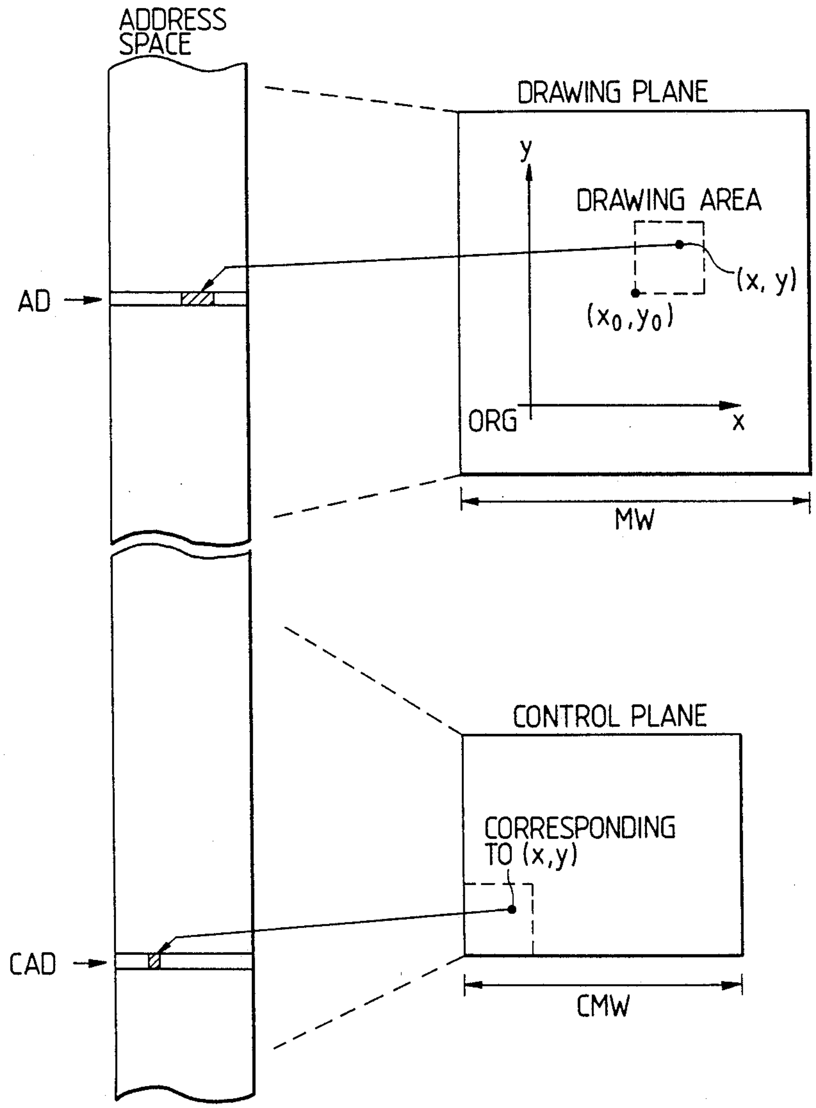
FIG. 12 is a drawing for explaining the relationship the x-y coordinates in the drawing and the control planes and a real address space in the frame buffer memory.

Referring to FIG. 12, description will be made of the relationship between the coordinate values in the x-y coordinate and a real address of the frame buffer memory 17. In the foregoing, the explanation of the processing operation has been done, using only the values in the two-dimensional x-y coordinates. Since, however, the frame buffer memory 17 has a one-dimensional linear address, the calculation becomes necessary in order to convert the values in the two-dimensional x-y coordinates into the real memory address. This calculation is executed by employing various parameter registers provided in the graphic processor 15.

In FIG. 12, (x, y) represents a dot drawn at that time, and AD indicates a linear address within the address space of the frame buffer memory 17, which corresponds to the dot (x, y). In this memory, when the dot (x, y) is moved horizontally, i.e., in the direction of the x-coordinate, n bits are added to or subtracted from AD, in which n is a number of bits necessary for displaying one pixel. In the case where the dot (x, y) is moved vertically, i.e., in the direction of the y-coordinate, MW bits are added to or subtracted from AD, in which MW is a number of bits of the width in the direction of the x-coordinate of the two-dimensional address space of the drawing planes 19.

Once a relationship between an origin ORG in the two-dimensional address space of the drawing planes 19 and a real address in the address space of the frame buffer memory 17 is determined, a dot (x, y) and a real address AD moves together while maintaining the relationship.

Similarly, for the control planes 21, a relationship between the two-dimensional address space of the planes and the linear address in the frame buffer memory 17 can be defined. In this memory, when the dot (x, y) is moved horizontally, 2 bits are added to or subtracted from CAD, because the control planes is formed as 2 bits/pixel. In the case where the dot (x, y) is moved vertically, CMW bits are added to or subtracted from CAD, in which CMW is a number of bits of the width in the direction of the x-coordinate of the two-dimensional address space of the control planes 21.

In this manner, the calculation of a linear address can be carried out by the graphic processor 15 in response to the movement of a dot (x, y).

Figure 13:
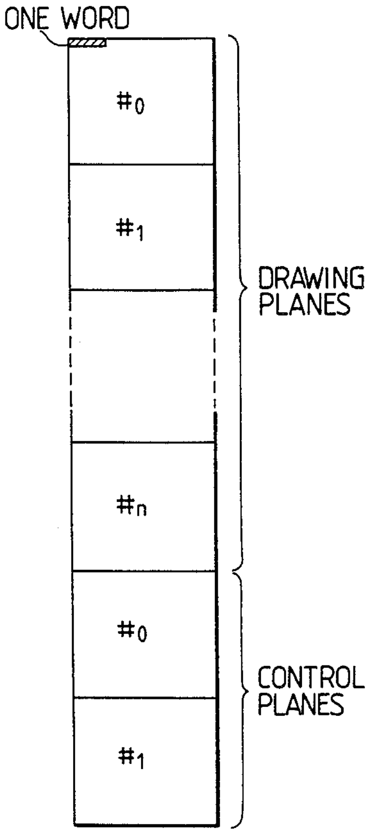
FIG. 13 is a drawing showing another example of the allotment of drawing planes and control planes in a frame buffer memory.

FIG. 13 shows another example of the allotment of data in a frame buffer memory. In the previously described example of the allotment of data, 32 bits of one word were allotted over the 32 sheets of the drawing planes, whereas in this example, 32 bits of one word are allotted within the same sheet of the planes. The respective planes can be changed over by addresses of the frame buffer memory.

Figure 14:
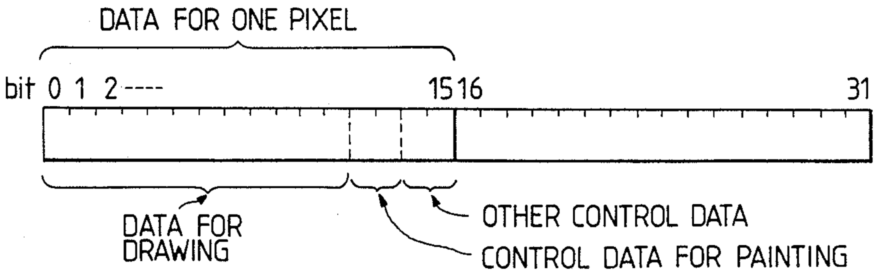
FIG. 14 is a drawing showing another example of the construction of data in the control plane.

In FIG. 14, there is shown still another example of the allotment of data in a frame buffer memory. In this case, both drawing data and control data are packed within the same one word. In the particular example shown, one word includes data of 16 bits/pixel for two pixels, and data for one pixel consists of drawing data of 12 bits (corresponding to the display by 4096 colors), control data of 2 bits for painting and data of 2 bits for other control, such as a cursor control and blink control. With this construction of data, the simultaneous read/write of drawing data and control data becomes possible by one time of access to the frame buffer memory.

I claim:

1. A method for displaying characters and/or figures in a computer graphic system, in which an outline or outlines of a character and/or figure to be displayed are drawn and then the painting thereof is effected, comprising the following steps:

step of drawing data (drawing data) of pixels forming the outline or outlines in dots of a first memory space defined in storage means of the computer graphic system dot by dot;

step, executed synchronously with drawing of drawing data of a pixel of the outline or outlines in a dot of the first memory space, of writing data (control data) for controlling the painting in a corresponding dot of second memory space defined in the storage means of the computer graphic system; and step of effecting the painting by scanning a predetermined area of the first memory space, in which area the outline or outlines are drawn, by a horizontal scanning line and carrying out the drawing of drawing data in dots of the first memory space, which exist on the horizontal scanning line, in accordance with the control data, characterized in:

that the control data writing step writes a control data in the corresponding dot of the second memory space is written by one of three different kinds of the control data in accordance with the state that the pixel belongs to a left edge of the outline or outlines, a right edge thereof or neither of them; and that the painting effecting step effects the drawing of drawing data in dots of the first memory space, which exist between dots corresponding to those dots of the second memory space which have the control data indicating the left edge and the right edge.

2. A method for displaying characters and/or figures in a computer graphic system according to claim 1, wherein when the control data writing step is executed, the second memory space is initialized in advance to clear all the content thereof at "0", and said step executes the following processings:

first processing of writing a control data "L" in the corresponding dot of the second memory space, if the pixel belongs to the left edge of the outline or outlines, and if a control data "R" is already written therein, rewriting "R" by a control data "0" indicating that the pixel belongs to neither of the left edge and the right edge; and second processing of writing "R" in the corresponding dot of the second memory space, if the pixel belongs to the right edge of the outline or outlines, and rewriting a control data already written therein by the control data "0", if the control data written is "L".

3. A method for displaying characters and/or figures in a computer graphic system according to claim 2, wherein the first and the second memory spaces are defined in the storage means of the computer graphic system as a two-dimensional memory space of x-y coordinates, and when taking note of adjacent two dots to be drawn in the first memory space, either one of the first and the second processings is executed before the variation of coordinate values between the two dots, and the other processing is executed after the variation of the coordinate values, in which the order of execution of the first and the second processings with respect to the variation of coordinate values is determined in accordance with the direction, in which the horizontal scanning line is shifted in the y-coordinate direction.

4. A method for displaying characters and/or figures in a computer graphic system according to claim 3, wherein the first processing comprises the following steps:

discriminating whether or not a difference between y-coordinate values of the two dots with respect to the direction of generation of the outline or outlines is negative, and if the difference is negative, ending the first processing;

if the difference is not negative, further discriminating whether or not a corresponding dot of the second memory space is written by "R"; and if a control data written in the corresponding dot of the second memory space is "0", writing "L" therein, and rewriting the control data already written therein by "0", if the control data written is "R", and the second processing comprising:

discriminating whether or not the difference is not negative, and if the difference is not negative, ending the second processing;

if the difference is negative, further discriminating whether or not a corresponding dot of the second memory space is written by "L"; and if a control data written in the corresponding dot of the second memory space is "0", writing "R" therein, and rewriting the control data already written therein by "0", if the control data written is "L".

5. A computer graphic apparatus for displaying characters and/or figures, comprising:

display means;

system memory means for storing various programs;

central processing means, coupled to said system memory means, for executing the programs stored in said system memory means to produce commands necessary for drawing an outline or outlines of a character and/or figure to be displayed and effecting the painting thereof;

frame buffer memory means including two memory spaces defined therein; a first memory space, having plural dots corresponding to pixels of said display means, for storing drawing data of pixels of the outline or outlines dot by dot and a second memory space, having plural dots corresponding to the dots of the first memory space, for storing control data for controlling the painting of the character and/or figure;

graphic processing means, coupled to said system memory means and central processing means as well as to said frame buffer memory means, for executing the commands supplied by said central processing means, whereby drawing data of the outline or outlines are drawn in dots of the first memory space, control data are written in corresponding dots of the second memory space synchronously with drawing of the drawing data in the first memory space, and the painting is effected in the first memory space in accordance with the control data written in the second memory space, characterized in that said graphic processing means, when it draws drawing data of a pixel of the outline or outlines in a dot of the first memory space, writes one of three different kinds of the control data in a corresponding dot of the second memory space in accordance with the state that the pixel belongs to a left edge of the outline or outlines to be drawn, a right edge thereof or neither of them, and draws drawing data in dots of the first memory space, which exist between dots corresponding to those dots of the second memory space which have the control data indicating the left edge and the right edge.

6. A computer graphic apparatus for displaying characters and/or figures according to claim 5, wherein every time when said graphic processing means draws drawing data of one pixel of an outline or outlines to be displayed in a dot of the first memory space, said means writes control data of the pixel in a corresponding dot of the second memory space as follow;

writing a control data "L" in the corresponding dot of the second memory space, if the pixel belongs to the left edge of the outline or outlines, and rewriting a control data already written therein by a control data "0" indicating that the pixel belongs to neither of the left edge and the right edge, if the control data written is "R"; and writing "R" in the corresponding dot of the second memory space, if the pixel belongs to the right edge of the outline or outlines, and rewriting a control data already written therein by "0", if the control data written is "L".

7. A computer graphic apparatus for displaying characters and/or figures according to claim 6, wherein the first and the second memory spaces are defined in said buffer memory means as a two-dimensional memory space of x-y coordinates, and when taking note of adjacent two dots to be drawn in the first memory space, either one of the "L" writing operation and the "R" writing operation is executed before the variation of coordinate values between the two dots, and the other writing operation is executed after the variation of the coordinate values, in which the order of execution of the "L" writing operation and the "R" writing operation is determined in accordance with the direction, in which the horizontal scanning line is shifted in the y-coordinate direction.

8. A computer graphic apparatus for displaying characters and/or figures according to claim 7, wherein said graphic processing means carries out the writing of the control data in the second memory space in accordance with the following steps:

in the "L" writing operation:

discriminating whether or not a difference between y-coordinate values of the two dots is negative with respect to the direction of generation of the outline or outlines, and if the difference is negative, ending the "L" writing operation;

if the difference is not negative, further discriminating whether or not a corresponding dot of the second memory space is written by "R"; and if "R" is drawn in the corresponding dot of the second memory space, rewriting "R" by "0", and otherwise, writing "L" therein, and in the "R" writing operation:

discriminating whether or not the difference is not negative with respect to the direction of generation of the outline or outlines, and if the difference is not negative, ending the "R" writing operation;

if the difference is negative, further discriminating whether or not the corresponding dot of the second memory space is written by "L"; and if "L" is drawn in the corresponding dot of the second memory space, rewriting "L" by "0", and otherwise, writing "R" therein.

9. A computer graphic apparatus for displaying characters and/or figures according to claim 5, wherein the first memory space is composed of plural planes defined in the frame buffer memory means, the number of which planes is determined in accordance with the number of colors and/or tones required for display of the characters and/or figures.

10. A computer graphic apparatus for displaying characters and/or figures according to claim 9, wherein the number of the planes of the first memory space is 32 and drawing data for at least one pixel can be packed within a data length of 32 bits as one word of the frame buffer memory means.

11. A computer graphic apparatus for displaying characters and/or figures according to claim 10, wherein the 32 bits as one word are allotted extending over the 32 planes of the first memory space.

12. A computer graphic apparatus for displaying characters and/or figures according to claim 10, wherein the 32 bits as one word are allotted within the same plane of the first memory space.

13. A computer graphic apparatus for displaying characters and/or figures according to claim 5, wherein the second memory space is composed of at least two planes defined in the frame buffer memory means.

14. A computer graphic apparatus for displaying characters and/or figures according to claim 5, wherein drawing data of a pixel and control data of the pixel are packed together within a data length of 32 bits as one word of the frame buffer memory means.

15. A computer graphic apparatus for displaying characters and/or figures according to claim 14, wherein two bits of the data length of 32 bits are dedicated to the control data.

* * * * *

UNITED STATES PATENT AND TRADEMARK OFFICE

CERTIFICATE OF CORRECTION

PATENT NO. : 4,967,376

DATED : October 30, 1990

INVENTOR(S) : K. Katsura

It is certified that error appears in the above-indentified patent and that said Letters Patent is hereby corrected as shown below:

Column 14, Claim 1, line 34, change"a" to --one of three different kinds of--.

Column 14, Claim 1, lines 36-37, delete "is written by one of three different kinds of the control data".

Signed and Sealed this

Twelfth Day of October, 1993

*Attest:*

BRUCE LEHMAN

*Attesting Officer*

*Commissioner of Patents and Trademarks*